United States Patent [19]

Nawrot et al.

[11] Patent Number: 5,419,374
[45] Date of Patent: May 30, 1995

[54] POLYAMIDE-BASED TUBE FOR A GASOLINE TRANSPORT

[75] Inventors: Serge Nawrot, Serquigny; Serge Lorek, Evrux; Albert Strassel, Oullins, all of France

[73] Assignee: Elf Atochem S. A., France

[21] Appl. No.: 26,149

[22] Filed: Feb. 25, 1993

[30] Foreign Application Priority Data

Feb. 25, 1992 [FR] France .................................. 92 02167

[51] Int. Cl.$^6$ .............................................. F16L 9/14
[52] U.S. Cl. ..................................... 138/137; 138/141; 138/DIG. 3
[58] Field of Search ......... 138/137, 141, 177, DIG. 3; 428/36.9, 36.91

[56] References Cited

U.S. PATENT DOCUMENTS

| | | | |
|---|---|---|---|
| 2,747,224 | 5/1956 | Koch et al. | 138/DIG. 3 |
| 2,828,236 | 3/1958 | West | 138/DIG. 3 |
| 3,109,461 | 11/1963 | Wolff et al. | 138/137 |
| 3,561,493 | 2/1971 | Maillard et al. | 138/137 |
| 4,215,177 | 7/1980 | Strassel | 138/DIG. 3 |
| 4,272,585 | 6/1981 | Strassel | 138/137 |
| 4,330,017 | 5/1982 | Satoh et al. | 138/137 |
| 4,613,532 | 9/1986 | Michel et al. | 138/118 |
| 4,706,713 | 11/1987 | Sadamitsu et al. | 138/137 |
| 4,887,647 | 12/1989 | Igarashi et al. | 138/137 |
| 4,942,906 | 7/1990 | Igarashi et al. | 138/137 |
| 4,984,604 | 1/1991 | Nishimura | 138/137 |
| 5,006,602 | 9/1991 | Guerin et al. | . |
| 5,038,833 | 8/1991 | Brunnhofer | . |
| 5,076,329 | 12/1991 | Brunnhofer | . |
| 5,093,166 | 3/1992 | Nishimura | 138/137 |

Primary Examiner—James E. Bryant, III
Attorney, Agent, or Firm—John L. Sigalos

[57] ABSTRACT

A polyamide-based tube for transporting a gasoline having resistance to permeability therethrough of the gasoline consisting essentially of an outer polyamide layer and an inner polyvinylidene fluoride layer bonded together by an adhesion binder.

5 Claims, No Drawings

POLYAMIDE-BASED TUBE FOR A GASOLINE TRANSPORT

BACKGROUND OF THE INVENTION

The present invention relates to a tube for the fluid fuel transport, particularly of a gasoline, to engines, in particular motor cars and to the method of making the same. The tube which is the subject of the invention is a polyamide tube lined internally with a polyvinylidene fluoride film.

For reasons of safety and of environmental protection, the automotive manufactures lay down for gasoline supply tubes mechanical characteristics—resistance and flexibility—and characteristics of increased resistance to permeability. The tubes must be as impermeable as possible to oil products and to their additives, in particular to methanol.

At the present time, polyamide tubes are usually used in the automotive industry. Polyamides represent an ideal material for this tube application, their mechanical resistance being excellent and their flexibility being sufficient so that a tube withstands, without breaking, during practically the entire life of the vehicle, the accumulation of flexions. These polyamide tubes no longer satisfy the new requirements of automotive manufacturers relating to permeability. With the increasing usage of methanol in gasoline, the sensitivity of the polyamide tubes manifests itself in a swelling of the tube leading to a decrease in the mechanical properties and to dimensional modifications.

SUMMARY OF THE INVENTION

In order to overcome this drawback, while preserving the mechanical effects of the polyamides, the subject of the invention comprises a gasoline supply tube consisting essentially of a polyamide tube whose inner wall is lined with a layer of polyvinylidene fluoride. The layer of polyvinylidene fluoride is preferably as thin as possible in order to preserve as much as possible the flexibility of the polyamide, given that polyvinylidene fluoride is not particularly well known for its flexibility properties. The invention also comprises the method of making the tube.

DETAILED DESCRIPTION

It is recommended that the tubes for the gasoline supply of engines should have generally an outer diameter of 6 to 12 mm, the thickness of the inner layer of polyvinylidene fluoride should lie between 10 $\mu$m and 1 mm, an intermediate layer of adhesion binder between the polyamide and the polyvinylidene fluoride of a thickness of 10 $\mu$m to 1 mm completing the tube. As used herein, the term "a gasoline" means any grade of gasoline including gasoline admixed with methanol.

It is indeed necessary for the polyvinylidene fluoride to be bonded efficiently to the polyamide. A tube which does not exhibit bonding between the polyvinylidene fluoride and the polyamide cannot have a good flexibility and therefore cannot be folded or bent easily by thermal forming; in this case, the thinnest material forms folds during the operation.

Besides, if the two layers do not bond together, the possible condensation of gases between the two layers can in time lead to the deformation of the thinnest part of the tube. Moreover, the tubes being connected to one another as well as to the gasoline tank and to the carburetor by means of conventional connections, the latter cannot ensure tightness against leaks if they depend on two disassociated layers. Finally, in the case where the thickness of the polyvinylidene fluoride layer inside the tube is very thin for example from 10 to several tens of microns, and without adhesion, a partial vacuum in the tube irreversibly deforms the film of polyvinylidene fluoride, making the tube unusable.

It has been found that such a tube consisting of an inner layer of polyvinylidene fluoride bonded by an adhesion binder to an outer layer of polyamide allows a decrease by a factor of 10 in the permeability with respect to an equivalent polyamide tube, while preserving the other properties, such as cold impact resistance, within the limits prescribed by the specifications of automotive manufacturers.

In order to ensure adhesion between the polyamide and the polyvinylidene fluoride, it is known to use a polymer having carbonyl groups on its polymeric chain, such as a polyurethane, a polyamide, a polyurea, a polyester, a copolymer having ethylene/carbonyl groups, or else their copolymeric derivatives or their mixtures.

Polyvinylidene fluoride may be mixed with this adhesion binder in a proportion of 1 to 50% by weight.

Other thermoplastic polymers or copolymers can also be added to this adhesion binder, as long as the adhesion binder is found in the mixture in a proportion of at least 50% by weight.

The polyamide used is usually a polyamide 11 or 12, which may or may not be plasticized, or else a polyamide 6 to 6.6. The polyamide may optionally be a product modified for impact resistance or a copolymer.

The polyvinylidene fluoride used is usually a homopolymer or a copolymer having at least 70% by weight of vinylidene fluoride residues. The polyvinylidene fluoride may also be mixed with another thermoplastic polymer, as long as at least 50% by weight of polyvinylidene fluoride is present in the mixture.

The invention also relates to tubes identical to their preceding ones, except for the fact that their diameter is greater. They are suitable for connecting the underground gasoline tank and the pump of the gasoline station.

The tube according to the invention is obtained in a known manner by coextrusion of the three components under known extrusion conditions suitable for each of the thermoplastic materials.

The following example illustrates the invention without limiting it.

EXAMPLE

A tube A with an external diameter of 8 mm, obtained conventionally in a three-component coextrusion installation, consists of:

(i) a layer of polyamide 12 (Rilsan © AESN black P40 TL), of a thickness of 600 $\mu$m, (ii) a layer of a thickness of 150 $\mu$m of a mixture of:

(a) 65 parts by weight of polyurethane (Estane © 58271), and (b) 35 parts by weight of an ethylene/vinyl acetate copolymer (OREVAC © 9307), and (iii) a layer of a polyvinylidene fluoride (Foraflon © 4000. HD), of a thickness of 250 $\mu$m.

For comparison purposes, a tube B with a diameter of 8 mm, obtained by simply extruding polyamide 12 (Rilsan © AESN black P40 TL), of a thickness of 1 mm, is tested in parallel with respect to the resistance to permeability by lead-containing super-grade gasoline containing 15% of methanol.

The following results are obtained:

|  | Tube A | Tube B |
| --- | --- | --- |
| Permeability in g/m²/day at 23° C. | 1.3 | 52 |
| Impact resistance at −40° C. standard DIN 73378 | No cracks | No cracks |

While the invention has been described in connection with a preferred embodiment, is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A polyamide-based tube for transporting a gasoline having increased resistance to permeability therethrough of said gasoline, consisting essentially of an outer polyamide layer providing a means to transport gasoline therein and of an inner polyvinylidene fluoride layer bonded to said outer polyamide layer by an adhesion binder bonding said polyvinylidene fluoride layer to said outer polyamide layer, said polyvinylidene fluoride layer having a thickness defining means for increasing the resistance to permeability of gasoline through the outer polyamide layer without substantially effecting the flexibility of the outer polyamide layer.

2. The tube according to claim 1, characterized in that the adhesion binder is a polymer or a copolymer having carbonyl groups on the polymer or copolymer polymeric chain.

3. The tube according to claim 1, characterized in that the thickness of the polyamide layer is between 0.8 and 1.8 mm, that of the polyvinylidene fluoride layer is between 10 $\mu$m and 1 mm, and that of the adhesion binder is between 10 $\mu$m and 1 mm.

4. The tube according to claim 2, characterized in that the thickness of the polyamide layer is between 0.8 and 1.8 mm, that of the polyvinylidene fluoride layer is between 10 $\mu$m and 1 mm, and that of the adhesion binder is between 10 $\mu$m and 1 mm.

5. The tube according to any one of claims 1 to 4, characterized in that the tube is obtained by extrusion.

* * * * *